United States Patent [19]

Hart

[11] 4,325,095
[45] Apr. 13, 1982

[54] MEANS FOR LIMITING POWER DISSIPATED IN AN A.C. MOTOR

[75] Inventor: Russell F. Hart, Blue Grass, Iowa

[73] Assignee: The Bendix Corporation, Southfield, Mich.

[21] Appl. No.: 195,029

[22] Filed: Oct. 8, 1980

[51] Int. Cl.³ .................... H02H 7/08; H02P 13/20
[52] U.S. Cl. ........................................ 361/23; 363/98
[58] Field of Search ............... 361/23, 30, 31, 33, 361/86, 87; 363/17, 55, 56, 58, 98, 97, 131, 132

[56] References Cited

U.S. PATENT DOCUMENTS

| 4,071,812 | 1/1978 | Walker | 363/132 X |
| 4,159,515 | 6/1979 | Walkowiak | 363/56 X |

FOREIGN PATENT DOCUMENTS 306536  7/1971  U.S.S.R. ........................ 363/58

Primary Examiner—Reinhard J. Eisenzopf
Attorney, Agent, or Firm—W. G. Christoforo; Bruce L. Lamb

[57] ABSTRACT

An A.C. motor is connected into a transistor bridge which includes a small current sensing resistor. The bridge is operated to supply alternating half cycles of current to the motor and resistor. The voltage drop across the resistor is compared in a comparator with a reference voltage which is equal to a fixed voltage minus a percentage of the bridge D.C. supply voltage. When the voltage drop across the resistor exceeds the reference voltage a gate means is closed to render the bridge transistors non-conductive.

8 Claims, 5 Drawing Figures

MEANS FOR LIMITING POWER DISSIPATED IN AN A.C. MOTOR

FIELD OF THE INVENTION

This invention relates to means for limiting the power dissipated in an A.C. motor driven by a square wave signal when the voltage level available varies over a wide range.

BACKGROUND OF THE INVENTION

Small electrical motors are used in a number of aircraft applications. Although D.C. power supplies are readily available on such aircraft, D.C. motors are not in favor due to the rapid wear through erosion of the brushes therefor at high altitudes. In addition, the arcing of D.C. motor brushes causes R.F. interference and the speed of D.C. motors is not constant. There has accordingly been a move to replace small D.C. motors on aircraft with A.C. synchronous motors powered by inverters, that is, D.C. to A.C. converters. The speed of these synchronous motors is dependent only upon the frequency of the A.C. power supply which can be easily frequency regulated by modern techniques. Although not speed sensitive to voltage changes, the wide variation of D.C. primary voltage generated by aircraft voltage generators can cause A.C. motors powered from the D.C. voltage source through an inverter to be dangerously overpowered. This could result in catastrophic overheating of the motor windings. It is thus necessary to either regulate the voltage source or otherwise limit the power delivered to the A.C. motor.

SUMMARY OF THE INVENTION

According to the present invention an A.C. motor is disposed across a transistor bridge circuit which, in response to a drive signal, alternates current through the motor. The bridge is connected to ground by a small resistance so that motor current flows therethrough. The voltage across the low resistance, which is proportional to motor load, is compared against a reference voltage which is inversely proportional to the unregulated D.C. supply voltage. As soon as the voltage proportional to motor load exceeds the reference voltage a signal is generated which closes a gate circuit which causes the motor current to be interrupted for the remainder of the instantaneous current half cycle. Thus, as motor supply voltage increases, current decreases, so as to maintain a nearly constant motor power over a wide variation in supply voltage.

DESCRIPTION OF THE PREFERRED EMBODIMENT

Figure 1:
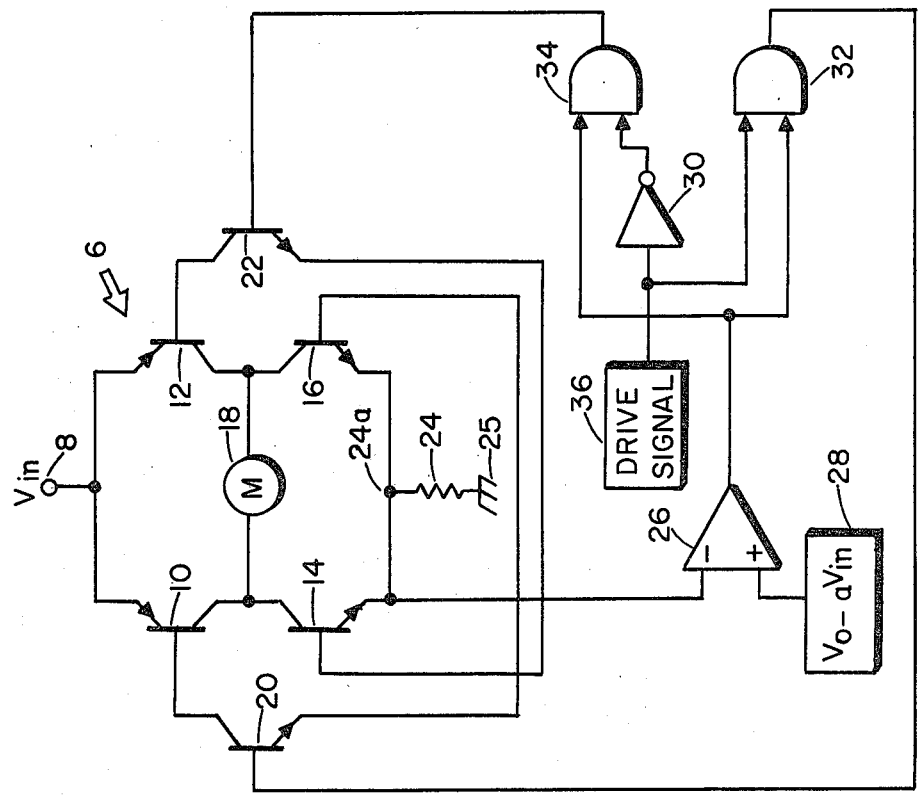
FIG. 1 is a simplified schematic of the invention.

Referring to FIG. 1 an unregulated D.C. voltage source, $V_{in}$, is connected across terminals 8 and 25 of transistor bridge 6 which includes a low resistance current sensing resistor 24 connected between point 24a and the D.C. return terminal, here designated as ground 25. The transistor bridge is comprised of, in one leg, PNP transistor 10 having its emitter electrode connected to terminal 8 and its collector electrode connected to the collector electrode of NPN transistor 14 whose emitter electrode is connected to terminal 24a. The other bridge leg is comprised of PNP transistor 12 having its emitter electrode also connected to terminal 8 and its collector electrode connected to the collector electrode of NPN transistor 16 whose emitter electrode is also connected to terminal 24a. An A.C. motor 18 is connected across the common electrode connection of transistors 10 and 14 and transistors 12 and 16.

NPN transistor 20 has its collector electrode connected to the base electrode of transistor 10 and its emitter electrode connected to the base electrode of transistor 16. NPN transistor 22 has its collector electrode connected to the base electrode of transistor 12 and its emitter electrode connected to the base electrode of transistor 14. The base electrodes of transistors 20 and 22 are connected respectively to the output terminals of AND gates 32 and 34.

Terminal 24a, and particularly the voltage thereat, is connected as one input to comparator 26. The second input to the comparator comprises a voltage level signal from reference level source 28 which is:

$$V_o - aV_{in}.$$

That is, a voltage level which is equal to a fixed voltage less a term which is proportional to the D.C. supply voltage. The comparator output terminal is connected to input terminals of AND gates 32 and 34. A drive signal source 36 is connected as the second input to AND gate 32 and through inverter 30 as the second input to AND gate 34. Drive signal source 36 is simply a square wave source such as a free running multivibrator. The drive signal is illustrated as the full line square wave of FIG. 2C. Operating through inverter 30 the square wave alternately qualifies gates 32 and 34. Assuming the signal from comparator 26 to be high the signals from gates 32 and 34 alternately drive transistors 20 and 22 which in turn alternately drive transistors 10 and 16 and transistors 12 and 14, respectively. This, of course, causes current to flow first from terminal 8 through transistor 10, motor 18, transistor 16 and resistor 24 to return terminal 25 and then from terminal 8 through transistor 12, motor 18, transistor 14 and resistor 24 to terminal 25. Thus, the motor voltage alternates and follows the curve of FIG. 2C and the drive signals at the base electrodes of transistors 20 and 22 follows the full line curves of FIGS. 2A and 2B, respectively.

Figure 2:
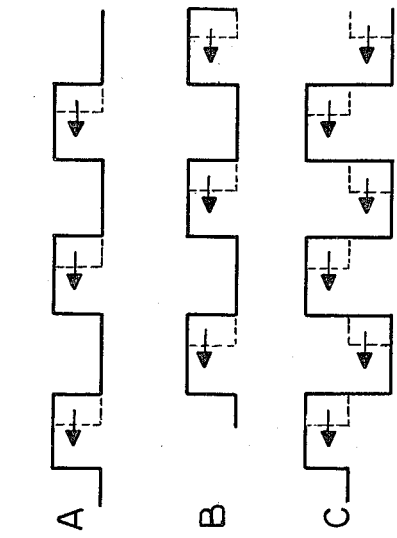
FIGS. 2A, 2B, and 2C are electrical waveforms at various points in the schematic of FIG. 1.

Assume now that the D.C. supply voltage, $V_{in}$, increases. This causes the reference voltage from reference level source to decrease. Of course, the increase in D.C. voltage will cause the current through the A.C. motor, and hence through resistor 24, to rise and particularly at the voltage transitions the current will increase more rapidly toward a higher level. However, when the current has risen to such a level that the voltage across resistor 24 exceeds the reference voltage from source 28 comparator 26 changes state to close gates 32 and 34. Thus, the drive for bridge circuit 6 is removed and current flow to motor 18 ceases for the remainder of that particular current half cycle. This is illustrated in FIG. 2 where the dashed lines indicate the termination of a particular pulse in response to a comparator 26 change of state. As the D.C. voltage level rises further the dashed lines move in the direction of the arrows.

Figure 3:
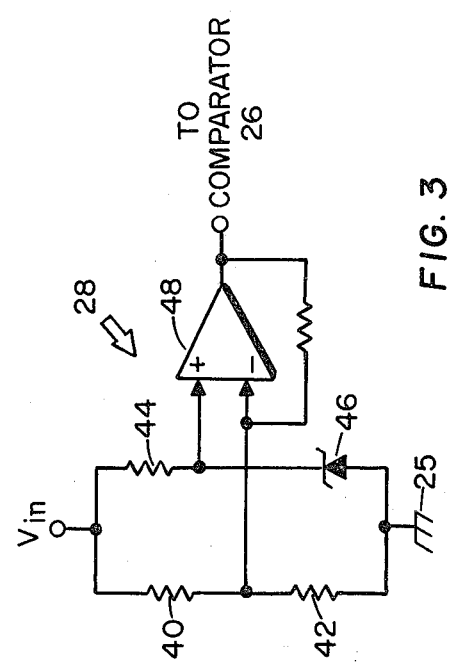
FIG. 3 is a schematic of the referenc voltage source.

Reference voltage source 28 is shown in greater detail in FIG. 3. A voltage divider comprised of resistors 40 and 42 is connected across the D.C. voltage source in parallel with the serial connection of resistor 44 and Zener diode 46. The common terminal of the voltage divider resistors is connected as one input to differentially connected amplifier 48, the voltage at this input comprising a percentage of the D.C. voltage, that percentage being determined by the voltage divider. The Zener regulated voltage point is resistively coupled to the other input terminal of amplifier 48, the voltage at this terminal thus being a fixed voltage. The amplifier output signal is thus equal to the difference of the fixed voltage and a percentage of the D.C. supply voltage.

Having described this embodiment of my invention various alterations and modifications thereof should now be obvious to one skilled in the art. Accordingly, the invention is to be limited only by the true spirit and scope of the appended claims.

The invention claimed is:

1. In an inverter circuit responsive to a varying D.C. voltage for delivering current in alternating half cycles to an A.C. motor, means for limiting the power delivered to said motor comprising:

means for generating a first voltage level related to the current through said motor, a voltage source for impressing a D.C. voltage across said inverter circuit;

means for generating a second voltage level equal to a constant voltage minus fixed percentage of said D.C. voltage; and, means comparing said first voltage level with said second voltage level for limiting the current delivered to said A.C. motor.

2. The circuit of claim 1 wherein said means for generating a first signal comprises a resistor arranged to intercept the current flowing through said motor, said first signal being related to the voltage drop in said resistor due to said current.

3. The circuit of claims 1 or 2 including a transistor bridge circuit comprised of first and second transistor means connected serially, and third and fouth transistor means serially connected parallel to said first and second transistor means and including means for alternately rendering conductive said first and fourth transistor means and said second and third conductor means, said motor being connected between the junction of said first and second transistor means and the junction of said third and fourth transistor means.

4. The circuit of claim 3 wherein the junction of said first and second transistor means comprises a first common collector electrode and the junction of said third and fourth transistor means comprises a second common collector electrode.

5. A circuit for limiting the power delivered to an A.C. Motor comprising:

a varying source of D.C. voltage;

first and second transistor means connected serially;

third and fourth transistor means connected serially parallel to said first and second transistor means;

resistance means having one end connected to the junction of said second and fourth transistor means; said D.C. voltage being connected between the other end of said resistance means and the junction of said first and third transistor means, said A.C. motor being connected between the junction of said first and second transistor means and the junction of said third and fourth transistor means;

first means for rendering said first and fourth transistor means conductive simultaneously when said first means is energized;

second means for rendering said second and third transistor means conductive simultaneously when said second means is energized;

means for generating a first signal related to the voltage drop across said resistance means;

means for generating a reference signal comprising a constant voltage minus a percentage of said D.C. voltage;

means for normally energizing said first and second means alternately whereby current is caused to flow in alternating half cycles through said A.C. motor; and, means responsive to said first signal and said reference signal for interrupting said means for energizing during at least part of an instantaneous half cycle.

6. A circuit for limiting the power delivered to an A.C. motor comprising:

a varying D.C. voltage source;

first and second transistor means connected serially;

third and fourth transistor means connected serially parallel to said first and second transistor means;

resistance means having one end connected to the junction of said second and fourth transistor means; said D.C. voltage source being connected between the other end of said resistance means and the junction of said first and third transistor means, said A.C. motor being connected between the junction of said first and second transistor means and the junction of said third and fourth transistor means;

first means for rendering said first and fourth transistor means conductive simultaneously when said first means is energized;

second means for rendering said second and third transistor means conductive simultaneously when said second means is energized;

means for generating a first voltage level related to the voltage drop across said resistance means;

means for generating a reference voltage level related to the voltage level of said D.C. voltage source;

means for normally energizing said first and second means alternately whereby current is caused to flow in alternating half cycles through said A.C. motor;

first gate means interposed between said means for energizing and said first means;

second gate means interposed between said means for energizing and said second means; and, means comparing said first and second voltage levels for closing said first and second gate means when said first and second voltage levels attain a predetermined relationship with one another.

7. The circuit of claim 6 wherein said reference voltage level comprises a constant voltage minus a percentage of said D.C. voltage.

8. The circuit of claim 7 wherein the input terminals of said A.C. motor are connected to transistor collector electrodes.

* * * * *